United States Patent [19]

Chen et al.

[11] 4,371,789

[45] Feb. 1, 1983

[54] POWER CONTROL ARRANGEMENT

[75] Inventors: I-Heng Chen, Naperville; Warren A. Liss, Aurora, both of Ill.

[73] Assignee: Bell Telephone Laboratories, Incorporated, Murray Hill, N.J.

[21] Appl. No.: 269,573

[22] Filed: Jun. 2, 1981

[51] Int. Cl.³ .......................... G05B 9/02; H02H 7/00
[52] U.S. Cl. ...................................... 307/38; 364/492
[58] Field of Search ........................ 307/31, 34, 38, 39, 307/113, 11; 364/492

[56] References Cited

U.S. PATENT DOCUMENTS 4,161,027  7/1979  Russell ............................ 307/11 X
4,238,688  12/1980  Boettcher et al. ................ 307/31 X
4,318,006  3/1982  Himeno et al. ....................... 307/38

FOREIGN PATENT DOCUMENTS 1300969  8/1969  Fed. Rep. of Germany ........ 307/38

*Primary Examiner*—Donald A. Griffin
*Attorney, Agent, or Firm*—P. Visserman; R. J. Godlewski

[57] ABSTRACT

In a telecommunications switching system having a central processor for generating control signals, peripheral units, and a power source terminal, a power control arrangement includes a plurality of power switches for selectively connecting and disconnecting the peripheral units and the power source terminal in order to minimize power consumption. Responsive to peripheral unit control signals, a power control unit, which is included in the arrangement, controls the operation of the power switches so that only those peripheral units designated by a control signal are connected to the power source terminal. After the peripheral units have been operated, the power control arrangement disconnects the operated peripheral units from the power source terminal.

14 Claims, 1 Drawing Figure

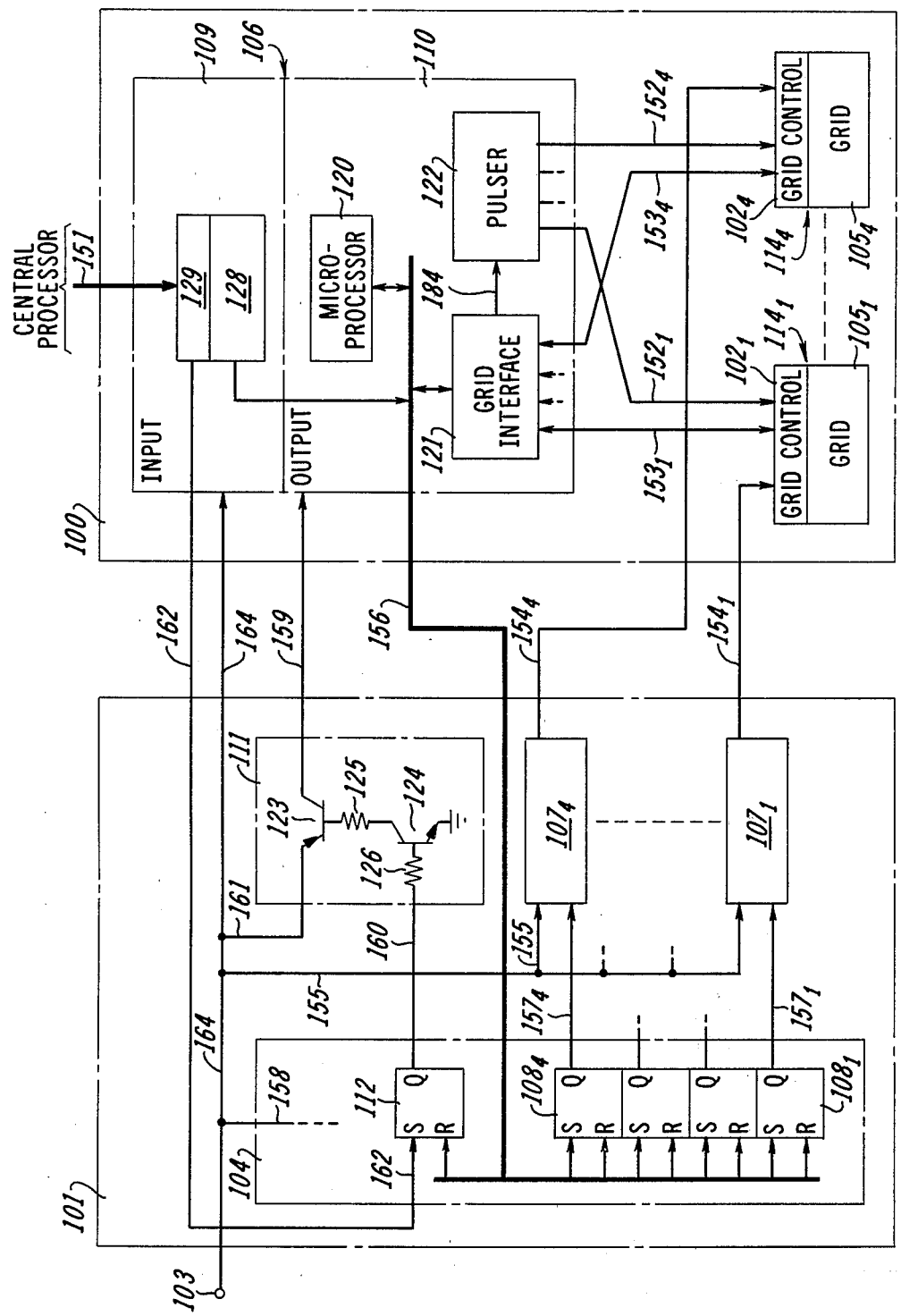

POWER CONTROL ARRANGEMENT

TECHNICAL FIELD

This invention relates generally to electrical power control systems and, more particularly, to a power control arrangement for selectively applying power to peripheral equipment of processor-controlled systems operated under the control of a central processor.

BACKGROUND OF THE INVENTION

One type of processor-controlled system is the telecommunication switching system. Modern telecommunication switching systems generally comprise peripheral equipment, including a switching network, and a central processor. The central processor controls the peripheral equipment by transmitting peripheral unit control signals over a bus which interconnects the processor and the peripheral equipment. The switching network may include a plurality of interconnected switching circuits, each comprising several grids of switches and a peripheral unit controller, for establishing transmission paths through the network. Peripheral unit controllers are responsive to peripheral unit control signals from the central processor to provide the necessary pulses to operate switches in each of the grids, as defined by the control signals.

Typically, a telecommunication system switching network is capable of handling high-peak traffic loads occurring only at certain times and has excess capacity at other times. In order to save energy, it is desirable to apply power only to the active elements of the switching network. However, it is not feasible to remove power from any large portion of the network and to restrict network activity to the remainder portion. Furthermore, any portion of the network which is not in use must at all times be immediately available for use in the event of an increase in traffic load.

SUMMARY OF THE INVENTION

A power control arrangement in accordance with this invention minimizes energy consumption of peripheral equipment in a processor-controlled system by selectively connecting a power source terminal only to the peripheral units receiving peripheral unit control signals from a central processor or the like. The power control arrangement, which may be connected to the system's peripheral bus, comprises a plurality of power switches and a power control circuit. The power control circuit is responsive to the peripheral unit control signals to operate the power switches to connect the power terminal only to those peripheral units designated by the control signals. In one illustrative embodiment of the invention, the power control arrangement controls the application of power to a telephone switching system network switching circuit having a controller with an input portion which receives peripheral unit control signals from a central processor and an output portion which provides control pulses to the switches of the network. Upon receiving a control signal from the central processor, the input portion signals the power control arrangement to connect the power source terminal to the output portion. Thereafter, the output portion signals the power control arrangement to connect the power source terminal to the grids of network switches containing switches to be operated in response to the peripheral unit control signals received from the central processor. After the network switches have been operated, the output portion signals the power control arrangement to disconnect the power source terminal from the grids of network switches and then signals the power control arrangement to disconnect the output portion from the power source terminal.

Advantageously, in accordance with this invention, energy consumption of peripheral equipment can be minimized by means of a power control arrangement that selectively applies power only to those peripheral units addressed by a peripheral unit control signal.

BRIEF DESCRIPTION OF THE DRAWING

The invention may be better understood from the following detailed description when read with reference to the drawing which shows an illustrative embodiment of a power control arrangement in accordance with this invention connected to the peripheral equipment of a telephone switching system.

DETAILED DESCRIPTION

In the illustrative embodiment shown in the drawing, power control arrangement 101 is connected to peripheral equipment 100 which is part of a processor-controlled telephone switching system. In such a system, the power control arrangement operates in response to peripheral unit control signals transmitted by the central processor to the peripheral equipment. The power control arrangement connects the peripheral equipment defined by the signals to a power source and disconnects the equipment from the power source when power is no longer needed. A processor-controlled switching system comprising a central processor and a switching network for interconnecting communication lines and trunks under control of the central processor, is described in general terms in the article entitled, "No. 1 Electronic Switching System," *The Bell System Technical Journal*, Volume 43, No. 5, September 1964.

Peripheral equipment 100 comprises peripheral unit controller 106 and four peripheral units $114_1, \ldots 114_4$ each for completing two stages of switching. Peripheral units $144_1, \ldots 114_4$ include grids $105_1, \ldots 105_4$ with uniquely associated grid control circuits $102_1, \ldots 102_4$, respectively, each grid having two ordered trays of remreed switches to form the two stages of switching. Remreed switches as they are used in telecommunications systems are described in general terms in the article entitled, "Remreed Switching Networks for No. 1 and No. 1A ESS," *The Bell System Technical Journal*, volume 55, No. 5, May—June 1976. Each grid control circuit contains control circuitry for directing pulses from the peripheral unit controller through a crosspoint matrix in response to an activation signal from the peripheral unit controller. These pulses operate remreed switches indicated by the activation signal in a well-known manner. By way of example, a crosspoint matrix and associated control circuitry are described in the aforementioned Bell System Technical Journal articles.

Controller 106 controls the operation of the peripheral units in response to control signals from a central processor or other like processing source, which may, for example, indicate particular remreed switches to be operated. The controller comprises an input portion 109 and an output portion 110 which are interconnected by data bus 156. Directly connected to power source terminal 103 via power lead 164, input portion 109 is continually powered in order to receive control signals via peripheral bus 151, which is connected to a central processor or the like. The input portion includes control circuitry 129 which directs a control signal from the peripheral bus into buffer register 128 in a well-known manner described, by way of example, in the aforementioned articles. Receiving a control signal, control circuitry 129 sends a set signal to power control arrangement 101 via conductor 162 in a well-known manner. The set signal causes the power control arrangement to connect output portion 110 to power source terminal 103.

With power applied, output portion 110 translates the control signal from buffer register 128 to determine which grid control circuit is associated with the indicated remreed switches and generates an enable signal for the power control arrangement and an activation signal for the associated grid control circuit. Output portion 110 includes microprocessor 120 for translating the control signal in order to generate the enable and activation signals and grid interface circuit 121 for serially transmitting the activation signal to the associated grid control circuit under the direction of the microprocessor. The microprocessor receives control signals from the buffer register and transmits enable signals to the power control arrangement via data bus 156. The enable signal causes the power control arrangement to connect power source terminal 103 to the associated grid control circuit. The microprocessor transmits the activation signal to the grid interface circuit via the data bus and directs the grid interface circuit to serially transmit the activation signal to the associated grid control circuit in a well-known manner. The activation signal indicates the remreed switches in the associated grid to be operated. In addition, the microprocessor may be programmed to perform the other standard functions of a peripheral unit controller such as diagnostics, timing, etc., as described in the aforementioned articles. Microprocessor 120 may be any well-known microprocessor, such as, for example, the Intel 8080, which may be readily programmed by any person skilled in the art to perform the aforementioned functions.

Grid interface circuit 121 comprises a standard flip-flop shift register and well-known circuitry which receives the activation signal and serially transmits it to the associated grid control circuit via one of the uniquely associated conductors $153_1, \ldots 153_4$. Responding, the associated grid control circuit establishes a path for pulser circuit 122 to pulse the indicated remreed switches. Using the path, the pulser circuit pulses the switches via one of the uniquely associated conductors $152_1, \ldots 152_4$ in response to a signal generated by the grid interface circuit. Pulser 122 is a well-known circuit, which is connected to the grid interface circuit via conductor 184, and is described in the aforementioned articles. After the indicated remreed switches have been operated, the microprocessor sends a reset signal to the power control arrangement via the data bus. The microprocessor may be programmed to wait a predetermined period of time after spending the activation signal to the grid interface circuit or, alternatively, to receive a signal from the grid control and grid interface circuits indicating the operation of the indicated remreed switches before sending the reset signal. The reset signal causes the power control arrangement to remove power from the associated grid control circuit. After power is removed from the associated grid control circuit, the microprocessor sends another reset signal to the power control arrangement to remove power from the output portion.

Power control arrangement 101 comprises grid control power switches $107_1, \ldots 107_4$ and output power switch 111, which are operated under the control of power control circuit 104, for selectively connecting and disconnecting power source terminal 103 to and from grid control circuits $102_1, \ldots 102_4$ and output portion 110 of the peripheral unit controller, respectively. Power switches $107_1, \ldots 107_4$ and 111 may be any of a number of well-known and commercially available switching devices. By way of example, power switch 111 comprises PNP power transistor 123 and NPN power transistor 124, the emitter and the collector of PNP transistor 123 being connected to power leads 161 and 159, respectively. The base of PNP transistor 123 connects to the collector of NPN transistor 124 through current limiting resistor 125, the base being connected to lead 160 via current limiting resistor 126. The emitter of NPN transistor 124 connects to ground. The other power switches are assumed to be of like design. Power leads 161 and 164 connect power source terminal 103 to output power switch 111, which is connected to output portion 110 via power lead 159. Likewise, power leads 155 and 164 connect power source terminal 103 to grid control power switches $107_1, \ldots 107_4$, which are connected to grid control circuits $102_1, \ldots 102_4$ via power leads $154_1$ through $154_4$, respectively.

Power control circuit 104 comprises grid control flip-flops $108_1, \ldots 108_4$ and output flip-flop 112 for controlling the operation of power switches $107_1, \ldots 107_4$ and 111, respectively. Power leads 158 and 164 connect power source terminal 103 to power control unit 104. Receiving a control signal, input portion 109 of the peripheral unit controller sends a set signal to output flip-flop 112, which in turn causes output power switch 111 to connect output portion 110 to power source terminal 103. Output flip-flop 112, which may be a well-known S-R flip-flop, controls output power switch 111 in response to the set signal received from input portion 109. A set signal applied to the S terminal of flip-flop 112 via conductor 162 sets flip-flop 112, which causes a high logic level signal on its Q output terminal. This high logic level signal applied via control lead 160 causes NPN transistor 124 to conduct current thereby causing PNP transistor 123 to conduct current from power source terminal 103 to output portion 110. With power applied, output portion 110 sends an enable signal to power control arrangement 101 in order to connect power source terminal 103 to the grid control circuit associated with the remreed switches indicated by the control signal. As previously described, microprocessor 120 translates the control signal stored in buffer register 128 to determine which grid control circuit is associated with the indicated remreed switches and transmits an enable signal to the associated grid control flip-flop in order to power the associated grid control circuit.

Grid control flip-flops $108_1, \ldots 108_4$, which may be a set of well-known S-R flip flops, control grid control power switches $107_1, \ldots 107_4$, respectively, in response to the enable signal received via data bus 156. The Q output terminal of grid control flip-flop $108_1, \ldots 108_4$ is connected to grid control power switch $107_1, \ldots 107_4$ via control lead $157_1, \ldots 157_4$, respectively. The S and R terminals of each grid control flip-flop are connected to a pair of conductors which represent one bit of the data bus. An enable signal applied to the S terminal of a grid control flip-flop causes the Q output terminal to assume a high logic level. A high logic level signal on the Q output terminal of a grid control flip-flop causes the associated power switch to connect the associated grid control circuit to power source terminal 103. As a result, power is applied to the associated grid control circuit.

Receiving an activation signal, the powered grid control circuit establishes a crosspoint matrix path, which is subsequently pulsed to operate the indicated remreed switches. After the indicated remreed switches have been operated, microprocessor 120 sends a reset signal via data bus 156 to grid control flip-flops $108_1, \ldots 108_4$ in order to disconnect the powered grid control circuit from power source terminal 103. A reset signal applied to the R terminal of a grid control flip-flop causes the Q output terminal to assume a low logic level, which in turn causes the associated grid control power switch to remove power from the associated grid control circuit. After power is removed from the associated grid control circuit, microprocessor 120 sends a reset signal to output flip-flop 112 in order to remove power from output portion 110 of the peripheral unit controller. This reset signal on data bus 156, which connects to the R terminal of flip-flop 112, resets the flip-flop thereby causing a low logic level signal on the Q output terminal. The low logic level signal causes output power switch 111 to disconnection output portion 110 from power source terminal 103. If subsequent control signals are received, the output portion is again connected to power source terminal 103, and the remreed switch interconnection process is repeated.

What has been described is only one specific illustrative embodiment of this invention, and it is to be understood that various and numerous other arrangements may be devised by one skilled in the art without departing from the spirit and scope of the invention as limited only by the accompanying claims.

What is claimed is:

1. A power control arrangement for use in a processor-controlled switching system having a central processor for generating peripheral unit control signals, a plurality of peripheral units operative in response to said peripheral unit control signals to perform operations defined by said control signals, and a power source terminal;

said power control arrangement comprising:
a plurality of power switches operative to connect said power source terminal to said peripheral units; and
power control means responsive to said peripheral unit control signals for selectively operating said plurality of power switches to connect said power source terminal only to those of said peripheral units designated to be operated by said control signals.

2. A power control arrangement for use in a telecommunications switching system having a central processor for generating peripheral unit control signals, a plurality of peripheral units operative in response to control pulses, controller means responsive to said peripheral unit control signals for selectively generating said control pulses to those of said peripheral units designated to be operated by said peripheral unit control signals, and a power source terminal;

said power control arrangement comprising:
a plurality of power switches operative to connect said power source terminal to said peripheral units; and
power control means responsive to said peripheral unit control signals for selectively operating said plurality of power switches to connect said power source terminal only to those of said peripheral units designated to be operated by said control signals.

3. A power control arrangement in accordance with claim 1 or 2, in which said plurality of power switches is selectively operative to connect and disconnect said power source terminal and said peripheral units, and said power control means operates said plurality of power switches to disconnect said power source terminal from said peripheral units after completing the operation of said peripheral units.

4. A power control arrangement in accordance with claim 3, in which said power control means comprises a plurality of bistable means uniquely associated with said plurality of power switches for controlling the operation of said plurality of power switches.

5. A power control arrangement in accordance with claim 4, in which each of said plurality of power switches comprises:
first transistor means selectively operative to connect and disconnect said power source terminal and one of said peripheral units, and
second transistor means uniquely associated with said plurality of bistable means for controlling the operation of said first transistor means.

6. A power control arrangement for use in a telecommunications switching system having a central processor for generating peripheral unit control signals, a plurality of peripheral units, controller means responsive to said peripheral unit control signals for selectively generating control pulses to operate said peripheral units, and a power source terminal;

said power control arrangement comprising:
a first power switch operative to connect said power source terminal to said controller means;
a plurality of other power switches operative to connect said power source terminal to said peripheral units; and
power control means responsive to said peripheral unit control signals for operating said first power switch and for selectively operating said plurality of other power switches to connect said power source terminal only to those of said peripheral units designated to be operated by said control signals.

7. A power control arrangement in accordance with claim 6 for use in a telecommunication switching system wherein said controller means is responsive to said peripheral unit control signals for generating reset signals, and wherein said plurality of other power switches are selectively operative to connect and disconnect said power source terminal and said peripheral units, and said power control means is responsive to said reset signals for operating said plurality of power switches to disconnect said power source terminal from said peripheral units after completion of the operation of said peripheral units.

8. A power control arrangement in accordance with claim 7, in which said first power switch is selectively operative to connect and disconnect said power source terminal and said controller means, and said power control means is responsive to said reset signals for operating said first power switch to disconnect said power source terminal from said controller means after said peripheral units have been disconnected from said power source terminal.

9. A power control arrangement for use in a telecommunications switching system having a central processor for generating peripheral control signals, a plurality of peripheral units, controller means having an input portion responsive to said peripheral control signals for generating set signals and an output portion responsive to said peripheral control signals for selectively generating control pulses to operate peripheral units and a power source terminal;

said power control arrangement comprising:
- a first power switch operative to connect said power source terminal to said output portion;
- a plurality of other power switches operative to connect said power source terminal to said peripheral units; and
- power control means responsive to said set signals for operating said first power switch and responsive to said peripheral control signals for selectively operating said plurality of other power switches to connect said power source terminal only to those of said peripheral units designated to be operated by said control signals.

10. A power control arrangement in accordance with claim 9 for use in a telecommunications switching system wherein said output portion of said controller comprises means for generating set signals corresponding to said control pulses, and wherein said power control means comprises bistable means responsive to said set signal to selectively operate said other power switches.

11. A power control arrangement in accordance with claim 10, for use in a telecommunications switching system wherein said output portion of said controller comprises means for generating reset signals, and wherein said plurality of other power switches are selectively operative to connect and disconnect said power source terminal and said peripheral units, and said power control means is responsive to said reset signals for operating said plurality of other power switches to disconnect said power source terminal from said peripheral units after completing the operation of said peripheral units.

12. A power control arrangement in accordance with claim 11, in which said first power switch is selectively operative to connect and disconnect said power source terminal and said output portion, and said first power control means is responsive to said reset signals for operating said power switch to disconnect said power source terminal from said output portion after said peripheral units have been disconnected from said power source terminal.

13. A power control arrangement in accordance with claim 12, in which said power control means comprises first bistable means for controlling the operation of said first power switch and a plurality of other bistable means uniquely associated with said plurality of other power switches for controlling the operation of said plurality of other power switches.

14. A power control arrangement in accordance with claim 13, in which each of said power switches comprises first transistor means selectively operative to connect and disconnect said power source terminal and a device requiring power and second transistor means responsive to the state of said bistable means for controlling the operation of said first transistor means.

* * * * *